US012669319B2

(12) United States Patent
Tanaka et al.

(10) Patent No.: US 12,669,319 B2
(45) Date of Patent: Jun. 30, 2026

(54) MEASURING DEVICE AND MEASURING METHOD

(71) Applicant: MITUTOYO CORPORATION, Kawasaki (JP)

(72) Inventors: Shunsuke Tanaka, Kanagawa (JP); Hirokazu Kobayashi, Saitama (JP)

(73) Assignee: MITUTOYO CORPORATION, Kawasaki (JP)

( * ) Notice: Subject to any disclaimer, the term of this patent is extended or adjusted under 35 U.S.C. 154(b) by 344 days.

(21) Appl. No.: 18/592,909

(22) Filed: Mar. 1, 2024

(65) Prior Publication Data

US 2024/0302150 A1 Sep. 12, 2024

(30) Foreign Application Priority Data

Mar. 6, 2023 (JP) ................................. 2023-033757

(51) Int. Cl.
　　*G01B 3/00* (2006.01)
　　*G01B 5/24* (2006.01)
　　*G01B 7/30* (2006.01)
(52) U.S. Cl.
　　CPC .............. *G01B 3/004* (2013.01); *G01B 5/24* (2013.01); *G01B 7/30* (2013.01); *G01B 2210/58* (2013.01)
(58) Field of Classification Search
　　CPC .. G01D 5/145; G01D 5/3473; G01D 2205/26; G01D 2205/85; G01D 5/2454; G01D 5/2458; G01D 5/2415; G01B 5/24
　　USPC ......... 324/207.15, 207.25, 207.21, 176, 179, 324/76.75; 33/1 PT, 1 N, 708; 250/231.18, 231.14
　　See application file for complete search history.

(56) References Cited

U.S. PATENT DOCUMENTS

| | | | |
|---|---|---|---|
| 6,622,391 B1 | 9/2003 | Shirai et al. | |
| 7,227,353 B2 * | 6/2007 | Fukaya | ................... G01D 5/145 |
| | | | 324/207.25 |
| 7,584,551 B2 * | 9/2009 | Suzuki | ..................... G01D 5/04 |
| | | | 33/813 |
| 8,339,126 B2 * | 12/2012 | Izak | ..................... G01D 5/2053 |
| | | | 324/207.16 |

(Continued)

FOREIGN PATENT DOCUMENTS

| | | | | |
|---|---|---|---|---|
| DE | 102019209862 A1 * | 1/2021 | ......... | G01D 5/34792 |
| JP | 2001-012967 A | 1/2001 | | |

(Continued)

*Primary Examiner* — Peter J Macchiarolo
(74) *Attorney, Agent, or Firm* — Rankin, Hill & Clark LLP

(57) ABSTRACT

A measuring device includes a rotary encoder having a rotary scale and a plurality of detection portions, and a control device. The rotary scale are arranged around a rotation axis and has a scale pattern in which a plurality of patterns are arranged along a circumferential direction. The plurality of detection portions are arranged around the rotation axis, and reads the plurality of patterns from the scale pattern. The control device causes one or some detection portions to perform a first reading of the plurality of patterns at a first timing, causes another or other detection portions to perform a second reading of the plurality of patterns at a second timing different from the first timing, and calculates a measurement result based on a first reading result of the first reading and a second reading result of the second reading.

5 Claims, 8 Drawing Sheets

(56) References Cited

U.S. PATENT DOCUMENTS

| | | | |
|---|---|---|---|
| 12,188,768 B2 * | 1/2025 | Tanaka ..................... | G01B 7/30 |
| 12,385,763 B2 * | 8/2025 | Baumgartner ......... | G01D 5/145 |
| 2009/0031578 A1 | 2/2009 | Suzuki et al. | |
| 2015/0123585 A1 * | 5/2015 | Yoshida ............. | G01D 5/34792 |
| | | | 310/68 B |
| 2024/0295418 A1 * | 9/2024 | Siraky ............... | G01D 5/24461 |

FOREIGN PATENT DOCUMENTS

| | | | | |
|---|---|---|---|---|
| JP | 4866653 B2 | | 2/2012 | |
| JP | 5112779 B2 | | 1/2013 | |
| JP | 2015-142192 A | | 8/2015 | |
| JP | 2016118491 A | * | 6/2016 | |
| WO | 2019/039344 A1 | | 2/2019 | |

\* cited by examiner

FIG. 3B                                                    FIG. 3C

REQUEST SIGNAL

SWITCHING SIGNAL:G

SIGNAL INPUT INTO
SWITCHING CIRCUIT OUTPUT a1

SIGNAL INPUT INTO
SWITCHING CIRCUIT OUTPUT a2

FLOW OF ADC DATA d1, d2

CALCULATED POSITION
VALUE BASED ON SIGNAL S1:P1

CALCULATED POSITION
VALUE BASED ON SIGNAL S2:P2

CALCULATED POSITION
VALUE BASED ON SIGNAL S3:P3

CALCULATED POSITION
VALUE BASED ON SIGNAL S4:P4

AVERAGE VALUE OF P1 TO P4

MEASURING DEVICE AND MEASURING METHOD

CROSS-REFERENCE TO RELATED APPLICATION

This application is based upon and claims the benefit of priority of the prior Japanese Patent Application No. 2023-033757 filed on Mar. 6, 2023, the entire contents of which are incorporated herein by reference.

FIELD

A certain aspect of embodiments described herein relates to a measuring device and a measuring method.

BACKGROUND

Conventionally, measuring devices that can detect a rotation angle around a specific axis or a rotation speed are known. Such measuring devices are equipped with a rotary encoder. A rotary encoder includes a scale in which a plurality of patterns are arranged in the circumferential direction, and a detection portion (detection head) facing the scale. A plurality of detection portions may be provided in order to improve detection accuracy in the measuring device (for example, see International Publication No. 2019/039344 and Japanese Patent Application Publication No. 2001-012967).

SUMMARY

In one aspect, the present invention aims to reduce peak power consumption during a reading operation of a scale by a detection portion in a measuring device equipped with a rotary encoder including a plurality of detection portions.

According to an aspect of the present invention, there is provided a measuring device including: a rotary encoder having a rotary scale and a plurality of detection portions, the rotary scale being arranged around a rotation axis and having a scale pattern in which a plurality of patterns are arranged along a circumferential direction, the plurality of detection portions being arranged around the rotation axis and each facing the rotary scale and reading the plurality of patterns from the scale pattern; and a control device configured to control the rotary encoder, wherein the control device causes one or some detection portions among the plurality of detection portions to perform a first reading of the plurality of patterns at a first timing, causes another or other detection portions different from the one or some detection portions to perform a second reading of the plurality of patterns at a second timing different from the first timing, and calculates a measurement result based on a first reading result of the first reading and a second reading result of the second reading.

According to another aspect of the present invention, there is provided a measuring method using a measuring device having: a rotary encoder having a rotary scale and a plurality of detection portions, the rotary scale being arranged around a rotation axis and having a scale pattern in which a plurality of patterns are arranged along a circumferential direction, the plurality of detection portions being arranged around the rotation axis and each facing the rotary scale and reading the plurality of patterns from the scale pattern; and a control device configured to control the rotary encoder, the method including: performing a first reading of the plurality of patterns using one or some detection portions among the plurality of detection portions at a first timing; performing a second reading of the plurality of patterns using another or other detection portions different from the one or some detection portions at a second timing different from the first timing; and calculating a measurement result based on a first reading result of the first reading and a second reading result of the second reading.

BRIEF DESCRIPTION OF DRAWINGS

FIG. 3B is an example of a time chart illustrating sampling timing in a rotary encoder included in measuring device of a second embodiment;

FIG. 3C is another example of a time chart showing sampling timing in a rotary encoder included in a measuring device of a second embodiment;

DESCRIPTION OF EMBODIMENTS

By the way, in a conventional rotary encoder equipped with a plurality of detection portions, the plurality of equipped detection portions simultaneously perform a reading operation (sampling) on the scale. Then, the measured value in the measuring device is obtained by calculating the average value of the detected values read by each detection portion.

However, such a conventional rotary encoder has a problem in that the peak current consumption increases when reading the scale.

Hereinafter, embodiments will be described with reference to the drawings.

(First embodiment) [Measuring device configuration] First, a schematic configuration of a measuring device 50 of a first embodiment will be described with reference to FIG.

Figure 1:
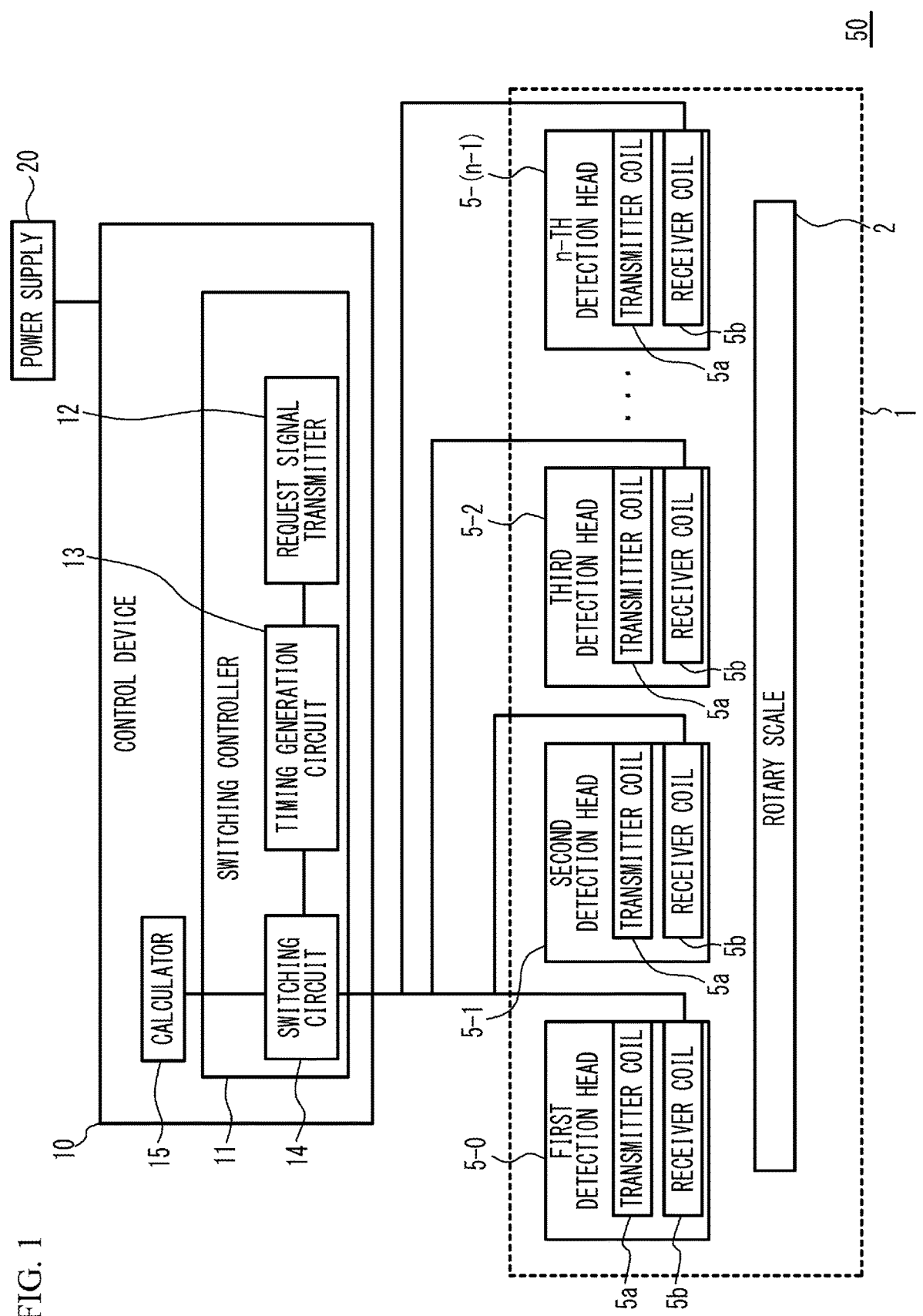
FIG. 1 is a block diagram illustrating a configuration of a measuring device according to a first embodiment.
Figure 2B:
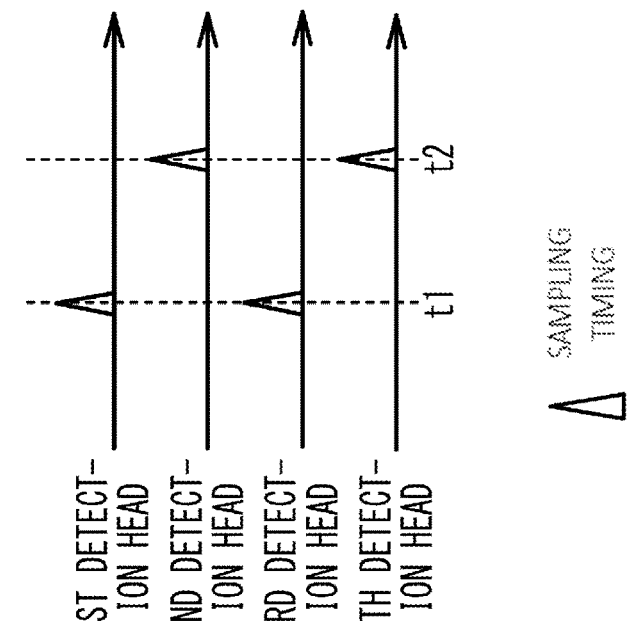
FIG. 2B is an example of a time chart illustrating sampling timing in a rotary encoder included in a measuring device of a first embodiment.
Figure 2A:
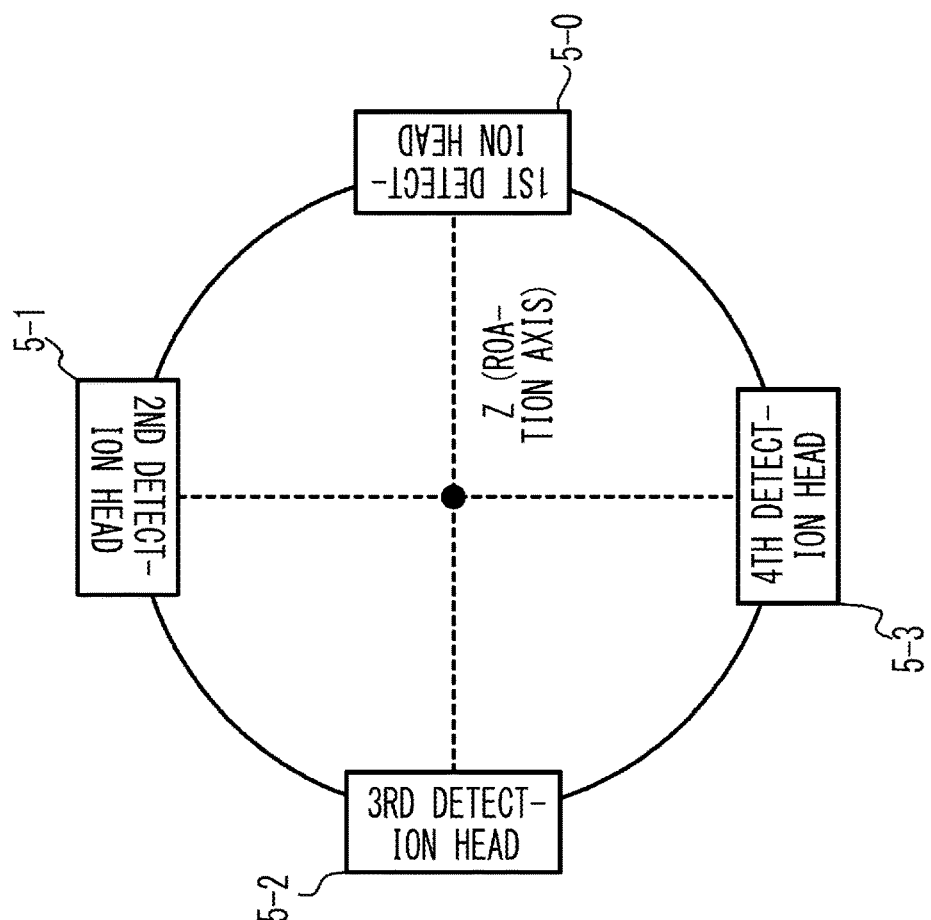
FIG. 2A is a diagram illustrating an example of an arrangement of detection heads in a rotary encoder included in a measuring device of a first embodiment.
Figure 6:
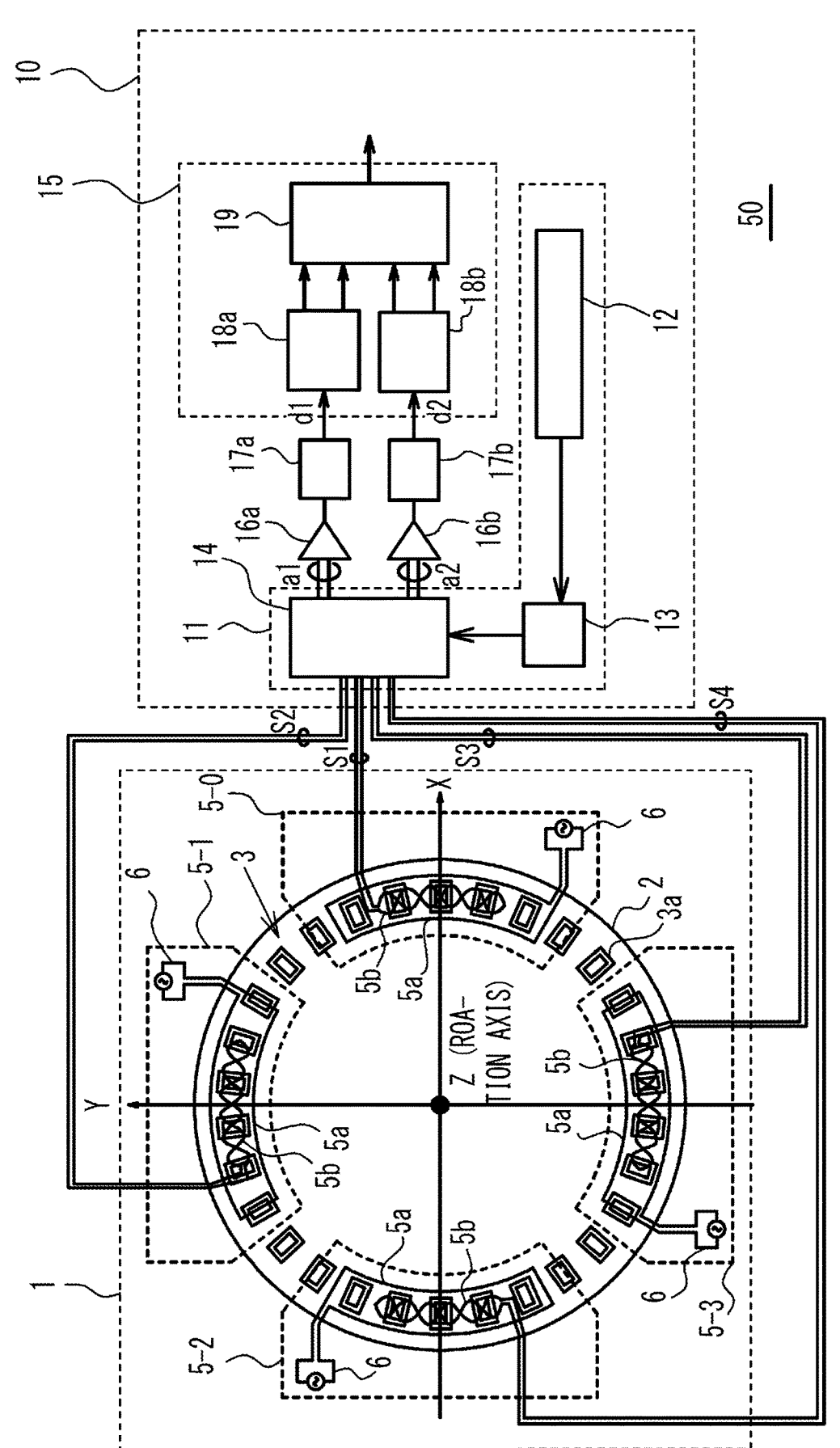
FIG. 6 is a diagram illustrating a configuration of a measuring device according to Example.

1, FIG. 2A, and FIG. 6. FIG. 1 is a block diagram illustrating the configuration of the measuring device 50 according to the embodiment. FIG. 2A is a diagram illustrating an example of an arrangement of detection heads 5-0 to 5-3 in a rotary encoder 1 included in the measuring device 50 of the first embodiment. FIG. 6 is a diagram illustrating the configuration of the measuring device 50 of an example to be described later. Since the example is explained as an example embodying the first embodiment, FIG. 6 is referred to as appropriate in the explanation of the first embodiment.

The measuring device 50 can measure the rotation angle and rotation speed of a rotating body (not illustrated) to be measured.

Referring to FIG. 1, the measuring device 50 includes the rotary encoder 1 and a control device 10. An electrical power supply 20 is connected to the control device 10. The control device 10 receives electrical power from the electrical power supply 20 and performs measurement using the rotary encoder 1.

<Rotary encoder> The rotary encoder 1 includes a rotary scale 2 and n numbers of (n is an integer of 2 or more) detection heads 5-0 to 5-(n−1). Each detection head corresponds to the detection portion. Referring to FIG. 2A, in the first embodiment, a first detection head 5-0 to a fourth detection head 5-3 are provided. The first detection head 5-0 to the fourth detection head 5-3 are arranged around the Z-axis, which is the center of rotation of the rotary scale 2, as a central axis. The detection heads 5-0 to 5-(n−1) are each provided with a transmission coil 5a and a receiver coil 5b. The four detection heads are installed at intervals of 90 degrees in a counterclockwise direction, with the position where the first detection head 5-0 is provided as a reference position (0 degrees).

The transmission coil 5a constitutes a fan-shaped coil whose length is in the circumferential direction (see FIG. 6). The receiver coil 5b forms a detection loop inside the transmission coil 5a that is repeated in the circumferential direction with a basic period λ by a positive and negative sinusoidal waveform pattern with a basic period λ (see FIG. 6).

As illustrated in FIG. 6, the rotary scale 2 is a disc-shaped member, and is attached to a rotation body (not illustrated) to be measured, with its rotation axis and center of rotation (Z-axis) aligned. The rotary scale 2 has a scale pattern 3 including a plurality of patterns 3a arranged at a fundamental period λ along the circumferential direction of the rotary scale 2. The pattern 3a is a closed loop coil. Each pattern 3a is electromagnetically coupled to the transmission coil 5a and also electromagnetically coupled to the receiver coil 5b.

A transmission circuit 6 is connected to each transmission coil 5a. The transmission circuit 6 generates a single-phase AC drive signal and supplies it to the transmission coil 5a. In this case, magnetic flux is generated in the transmission coil 5a. As a result, electromotive currents are generated in the plurality of patterns 3a. The plurality of patterns 3a generate magnetic flux that changes at a predetermined spatial period in the circumferential direction by electromagnetically coupling with the magnetic flux generated by the transmission coil 5a. The magnetic flux generated by the transmission coil 5a causes an electromotive current to be generated in the receiver coil 5b. The electromagnetic coupling between each coil changes according to the amount of displacement of the rotary scale 2, and a sine wave signal having the same period as the fundamental period λ is obtained.

The receiver coil 5b is formed, for example, into a flat member. The flat member is, for example, a substrate. Each of the receiver coils 5b has a section for switching between positive and negative sine waveform patterns. Therefore, the receiver coil 5b has a thickness not only on the surface of the flat member. The receiver coil 5b can also be formed on a printed wiring board. In this case, the sinusoidal waveform pattern is placed with an insulator in between, and a through hole is placed in the switching section to electrically connect the two. Each of the receiver coils 5b is connected to a switching circuit 14 included in the control device 10, respectively. The switching circuit outputs a1 and a2 outputted from the switching circuit are subjected to calculation in a calculator 15. The switching circuit outputs a1, a2 and the calculations in the calculator 15 will be described in detail later. Although each of the receiver coils 5b and the switching circuit 14 are connected by wire, they may be connected wirelessly.

In this embodiment, each detection head is equipped with the transmission coil 5a, but for example, one transmission coil may be provided independently, and a signal transmitted from this transmission coil toward the rotary scale 2 can be transmitted to each of the receiver coils 5b.

In the rotary encoder 1 of this embodiment, the rotary scale 2 is mounted on the rotating body side that is the object to be measured, but the detection heads 5-0 to 5-(n−1) may be set on the rotating body side. In short, the rotary encoder 1 only needs to be placed in a state where the rotary scale 2 and the detection heads 5-0 to 5-(n−1) face each other with respect to the object to be measured.

Although the rotary encoder 1 of this embodiment is of an electromagnetic induction type, it may also be of a form using other detection principles such as a capacitance type or a photoelectric type. In the case of using a rotary encoder of another type, a transmission portion and a receiver portion corresponding to the format adopted by the rotary encoder are used as the transmission coil and the receiver coil, respectively.

Note that the distance between each detection head, the dimensions of each detection head, and the dimensions of the rotary scale 2 in each figure are not accurately represented. Further, the dimensions of the patterns 3a and the distances between the patterns 3a in each figure are not accurately represented.

<Control device> The control device 10 includes A switching controller 11 and the calculator 15. The switching controller 11 switches the detection head for reading the pattern 3a from the scale pattern 2. As will be described in detail later, the measuring device 50 of this embodiment performs a first reading by causing some of the detection heads 5-0 to 5-(n−1) to read the pattern 3a at a first timing. Furthermore, the measuring device 50 performs a second reading by causing another detection head, which is different from the detection head that performed the first reading, to read the pattern 3a at a second timing different from the first timing. The switching controller 11 switches between the detection head that performs the first reading and the detection head that performs the second reading. Note that the second reading corresponds to another reading different from the first reading. In this embodiment, in the first reading, reading is performed by the first detection head 5-0 and the third detection head 5-2. Further, in the second reading, reading is performed by the second detection head 5-1 and the fourth detection head 5-3.

The switching controller 11 includes a request signal transmitter 12, a timing generation circuit 13, and the switching circuit 14.

The request signal transmitter 12 transmits a request signal instructing the rotary encoder 1 to perform measurement. The request signal is transmitted at regular intervals according to a preset cycle. The period at which the request signal is transmitted is set in advance as a specification for each model of the measuring device 50, regardless of the rotational speed of the rotating body to be measured. That is, while the measuring device 50 is in operation, the period at which the request signal is transmitted is constant.

The timing generation circuit 13 transmits a switching signal G specifying the state of the switching circuit 14 at a predetermined timing. As will be described in detail later, the switching circuit 14 can change its connection state in various ways, such as a state in which the first reading is performed, a state in which the second reading is performed, and a state in which neither reading is performed. The switching circuit 14 switches the internal connection state according to the switching signal G transmitted by the timing generation circuit 13. Note that the measuring device 50 can prepare types of switching signals G depending on the number of combinations of detection heads that simultaneously read the pattern 3*a*. For example, in a measuring device that performs a third reading in addition to the first reading and the second reading, a switching signal G is prepared to change the connection state of the switching circuit 14 to a state that performs the third reading.

The switching circuit 14 has a switch function and switches the detection heads 5-0 to 5-(*n*−1) between a connected state and an unconnected state. Switching between the connected state and the unconnected state can be performed for each detection head. At the timing of performing the first reading, the switching circuit 14 connects the detection head that performs the first reading and reads the pattern 3*a*. At the timing of performing the second reading, the switching circuit 14 connects the detection head that performs the second reading and reads the pattern 3*a*. During the period in which the first reading and the second reading are not performed, the switching circuit 14 disconnects all detection heads.

<Calculator> The calculator 15 calculates the measurement result based on the reading result in the first reading and the reading result in the second reading. In this embodiment, the average of the angle data respectively acquired by the first detection head 5-0 to the fourth detection head 5-3 is calculated, and the result is output as the measurement result.

[Sampling timing] Next, with reference to FIG. 2B, the sampling timing at which each detection head reads the pattern 3*a* will be described. FIG. 2B is an example of a time chart showing sampling timing in the rotary encoder included in the measuring device of the first embodiment.

In this embodiment, the first detection head 5-0 to the fourth detection head 5-3 are provided at intervals of 90°. As a result, the first detection head 5-0 and the third detection head 5-2 are separated by 180 degrees and are placed facing each other. Further, the second detection head 5-1 and the fourth detection head 5-3 are separated by 180 degrees and are placed facing each other. In other words, the first detection head 5-0 and the third detection head 5-2 are arranged at positions equal to one rotation of the rotary scale 2, that is, 360° divided into two. Further, the second detection head 5-1 and the fourth detection head 5-3 are similarly arranged at positions dividing 360° into two.

In this embodiment, the first detection head 5-0 and the third detection head 5-2 of the four detection heads arranged in this manner perform the first reading at the first timing t1. Then, the second detection head 5-1 and the fourth detection head 5-3 perform a second reading at the second timing t2.

Here, the measurement accuracy in this embodiment will be explained. Assume that the center of rotation of the rotary scale 2 and the center of arrangement of the four detection heads 5-0 to 5-3 are deviated by an eccentricity error ΔC. Here, in order to make the explanation easier to understand, it is assumed that the rotation center (Z-axis) is located on a line segment connecting the second detection head 5-1 and the fourth detection head 5-3. Therefore, when the radius of the circle drawn by connecting the center lines of the scale pattern 3 of the rotary scale 2 is R, the detected value of the first detection head 5-0 includes an error of ATAN (ΔC/R). Similarly, the detection by the third detection head 5-2 also includes an error of ATAN (ΔC/R). However, the detection value of the first detection head 5-0 and the detection value of the third detection head 5-2 have the same absolute value, but have opposite signs.

In this way, the first detection head 5-0 and the third detection head 5-2 are affected by the eccentricity error ΔC. On the other hand, the second detection head 5-1 and the fourth detection head 5-3 are not affected by the eccentricity error ΔC.

In this embodiment, the first reading and the second reading performed at a different timing from the first reading are performed. Then, the average value of the detected values read at the timing of the first reading is calculated. Further, the average value of the detected values read at the timing of the second reading is calculated.

Here, suppose that the first reading is performed by the first detection head 5-0 and the second detection head 5-1, and the second reading is performed by the third detection head 5-2 and the fourth detection head 5-3. In this case, the average value of the detection value of the first detection head 5-0 and the detection value of the second detection head 5-1 is calculated. Similarly, the average value of the detection value of the third detection head 5-2 and the detection value of the fourth detection head 5-3 is calculated.

In this case, the detection value of the first detection head 5-0 is affected by the eccentricity error ΔC, and the detection value of the second detection head 5-1 is not affected by the eccentricity error ΔC. Therefore, the average value of these detected values is affected by the eccentricity error ΔC. The average value of the detection value of the third detection head 5-2 and the detection value of the fourth detection head 5-3 is similarly affected by the eccentricity error ΔC.

In contrast, in this embodiment, the average value of the detection value of the first detection head 5-0 and the detection value of the third detection head 5-2, which have opposite signs, is calculated. Therefore, the influence of the eccentricity error ΔC is canceled out, and the influence of the eccentricity error ΔC can be eliminated. Note that the detection value of the second detection head 5-1 and the detection value of the fourth detection head 5-3 are not affected by the eccentricity error ΔC. Therefore, the average value of these detected values is highly accurate.

In this way, two detection heads operate at each timing. Therefore, the peak current consumption value can be reduced compared to the case where four detection heads are operated at the same timing. In addition, measurement accuracy can be maintained.

According to this embodiment, reading is performed by two detection heads at the first timing, and reading is performed by the remaining two detection heads at the second timing. Therefore, current consumption at each timing can be suppressed. Furthermore, since the measurement results are obtained using the reading results at each timing, the accuracy of the measurement results can be ensured.

Figure 3A:
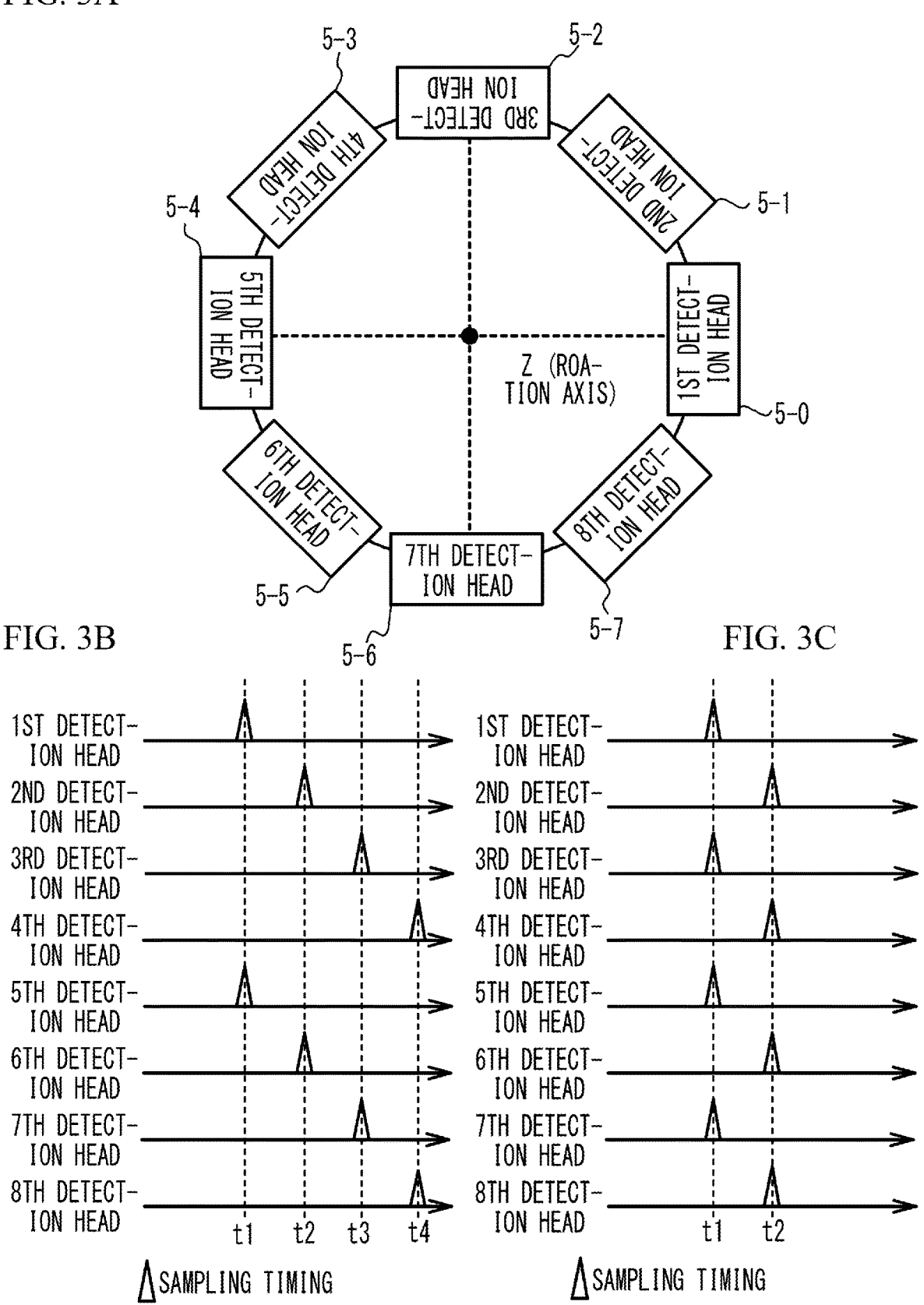
FIG. 3A is a diagram illustrating an example of an arrangement of detection heads in a rotary encoder included in a measuring device according to a second embodiment.

(Second embodiment) Next, a second embodiment will be described with reference to FIG. 3A to FIG. 3C. Referring to FIG. 3A, the second embodiment includes eight detection heads, the first detection head 5-0 to an eighth detection head 5-7. Each detection head is spaced apart by 45 degrees.

The first detection head 5-0 and the fifth detection head 5-4 are placed 180 degrees apart and face each other. The second detection head 5-1 and the sixth detection head 5-5 are arranged at positions 180° apart and face each other. The third detection head 5-2 and the seventh detection head 5-6 are arranged at positions 180 degrees apart and face each other. The fourth detection head 5-3 and the eighth detection head 5-7 are arranged at positions 180° apart and face each other.

Referring to FIG. 3B, a set of detection heads placed 180 degrees apart and facing each other perform sampling at the same timing. That is, the first detection head 5-0 and the fifth detection head 5-4 perform the first reading at the first timing t1. The second detection head 5-1 and the sixth detection head 5-5 perform second reading at the second timing t2. The third detection head 5-2 and the seventh detection head 5-6 perform third reading at the third timing t3. The fourth detection head 5-3 and the eighth detection head 5-7 perform the fourth reading at the fourth timing t4.

In this embodiment, reading is performed by two detection heads at respective timings. Therefore, current consumption can be reduced compared to the case where reading is performed by all detection heads at the same timing. Furthermore, since the measurement results are obtained using the reading results at each timing, the accuracy of the measurement results can be ensured similarly to the first embodiment.

Note that when the detection head is arranged as illustrated in FIG. 3A, sampling as illustrated in FIG. 3C may be performed. That is, the first detection head 5-0, the third detection head 5-2, the fifth detection head 5-4, and the seventh detection head 5-6 perform reading at the first timing t1. Further, the second detection head 5-1, the fourth detection head 5-3, the sixth detection head 5-5, and the eighth detection head 5-7 perform reading at the second timing t2. Even when such sampling is performed, current consumption can be reduced compared to when reading is performed by all detection heads at the same timing. Furthermore, since the measurement results are obtained using the reading results at each timing, the accuracy of the measurement results can be ensured.

Figures 4A, 4B, 4C:
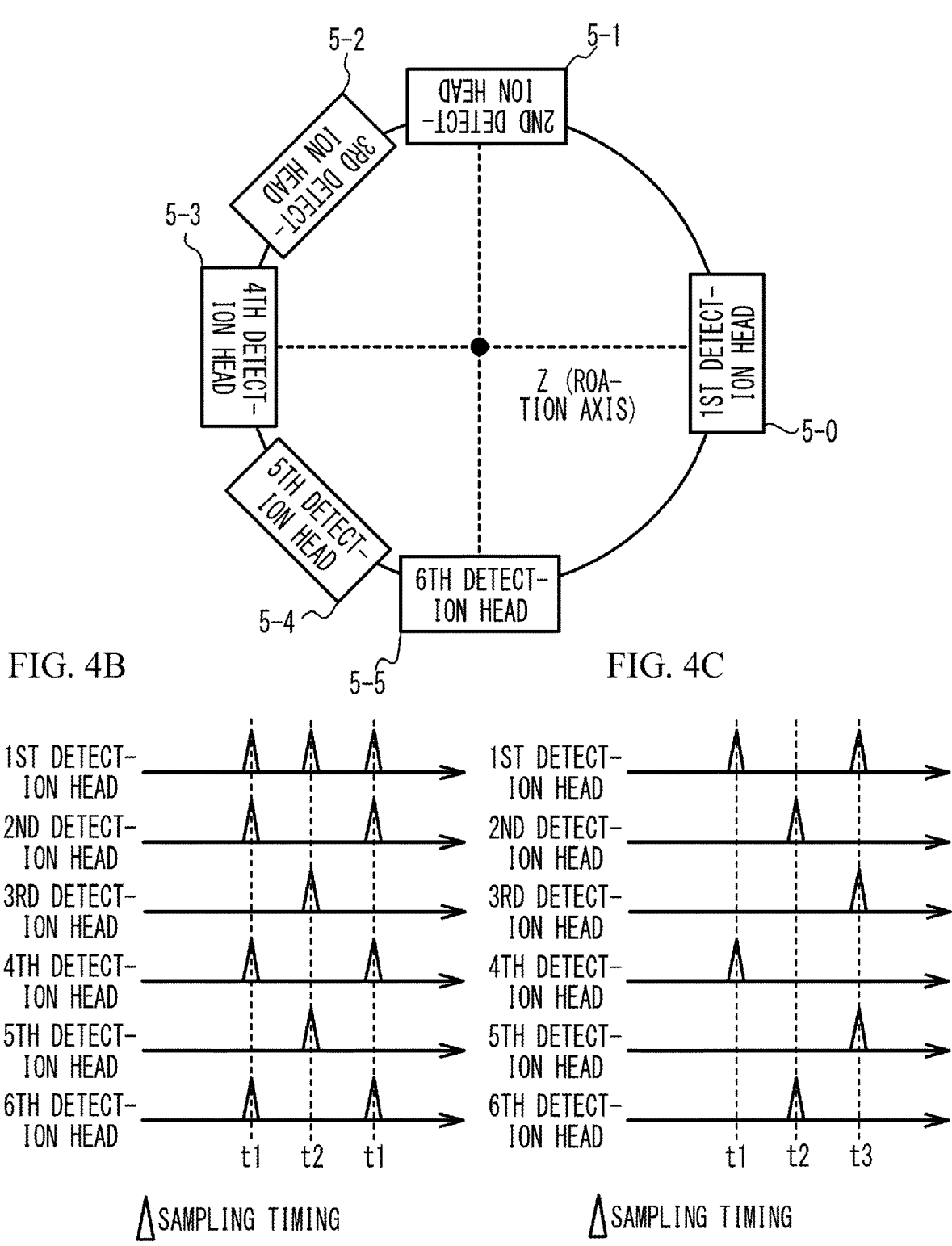
FIG. 4A is a diagram illustrating an example of an arrangement of detection heads in a rotary encoder included in a measuring device according to a third embodiment.
FIG. 4B is an example of a time chart illustrating sampling timing in a rotary encoder included in a measuring device of a third embodiment.
FIG. 4C is another example of a time chart showing sampling timing in a rotary encoder included in a measuring device of a third embodiment.

(Third embodiment) Next, a third embodiment will be described with reference to FIG. 4A to FIG. 4C. Referring to FIG. 4A, the third embodiment includes six detection heads, the first detection head 5-0 to the sixth detection head 5-5. However, unlike other embodiments, the detection heads are not arranged at equal intervals.

The first detection head 5-0 is placed at the reference position (0°). The second detection head 5-1 is arranged at a position rotated 90 degrees Counterclockwise with respect to the first detection head 5-0. The third detection head 5-2 is arranged at a position rotated 120 degrees Counterclockwise with respect to the first detection head 5-0. The fourth detection head 5-3 is arranged at a position rotated 180 degrees Counterclockwise with respect to the first detection head 5-0. The fifth detection head 5-4 is arranged at a position rotated 240° Counterclockwise with respect to the first detection head 5-0. The sixth detection head 5-5 is arranged at a position rotated 270° counterclockwise with respect to the first detection head 5-0.

Referring to FIG. 4B, the first detection head 5-0, the second detection head 5-1, the fourth detection head 5-3, and the sixth detection head 5-5 perform the first reading at the first timing t1. The first detection head 5-0, the third detection head 5-2, and the fifth detection head 5-4 perform the second reading at the second timing t2.

Even when such sampling is performed, current consumption can be reduced compared to when reading is performed by all detection heads at the same timing. Furthermore, since the measurement results are obtained using the reading results at each timing, the accuracy of the measurement results can be ensured.

Note that when the detection head is arranged as illustrated in FIG. 4A, sampling as illustrated in FIG. 4C may be performed. That is, the first detection head 5-0 and the fourth detection head 5-3 perform reading at the first timing t1. The second detection head 5-1 and the sixth detection head 5-5 perform reading at the second timing t2. The first detection head 5-0, the third detection head 5-2, and the fifth detection head 5-4 perform reading at the timing t3. Even when such sampling is performed, current consumption can be reduced compared to when reading is performed by all detection heads at the same timing. Furthermore, since the measurement results are obtained using the reading results at each timing, the accuracy of the measurement results can be ensured.

(Fourth embodiment) Next, a fourth embodiment will be described with reference to FIG. 5A and FIG. 5B. In the fourth embodiment, as illustrated in FIG. 5A, the arrangement of the detection head itself is the same as in the third embodiment.

Figures 5A, 5B:
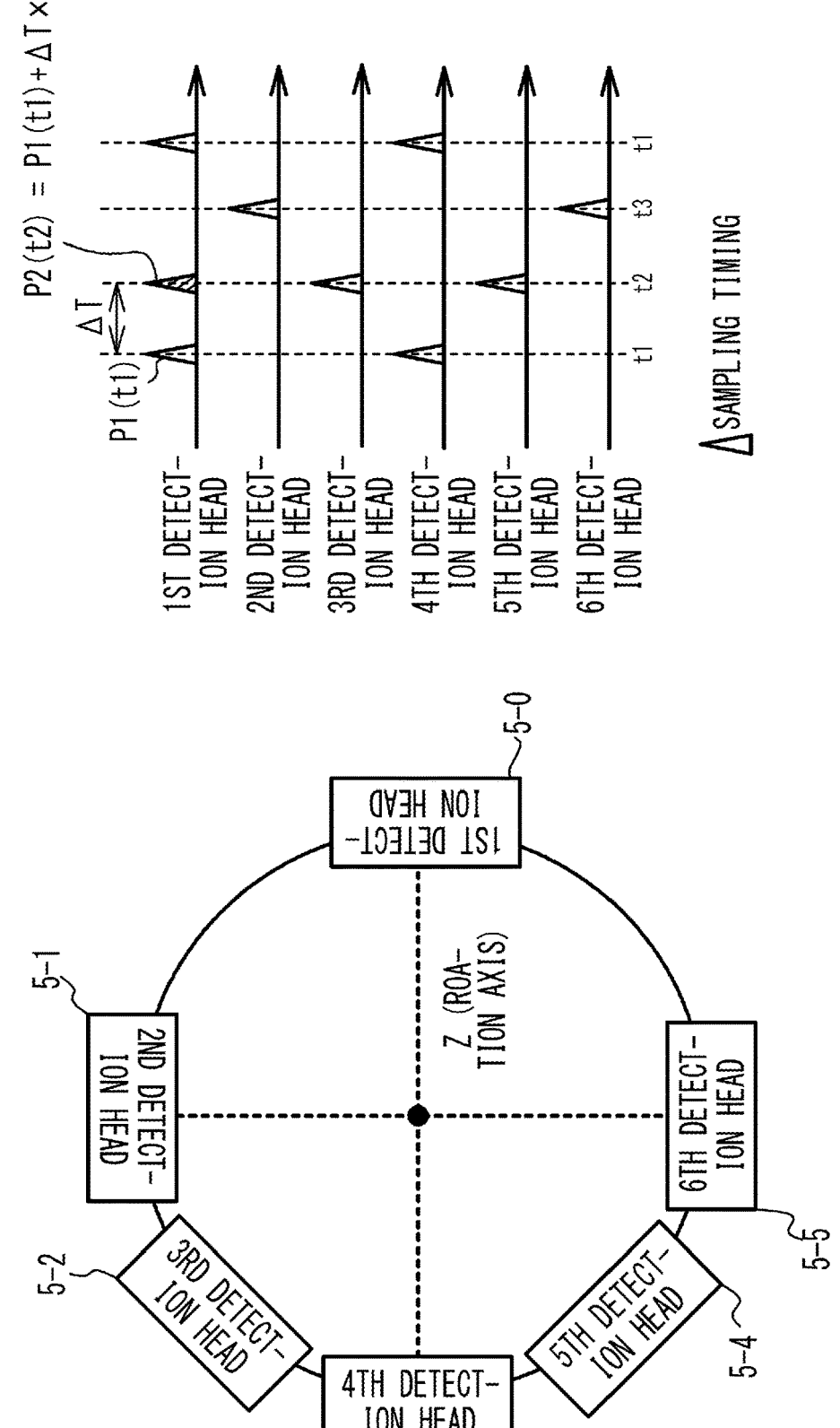
FIG. 5A is a diagram illustrating an example of an arrangement of detection heads in a rotary encoder included in a measuring device according to a fourth embodiment.
FIG. 5B is an example of a time chart illustrating sampling timing in a rotary encoder included in a measuring device of a fourth embodiment.

Referring to FIG. 5B, in the fourth embodiment, the first detection head 5-0 and the fourth detection head 5-3 perform the first reading at the first timing t1. The third detection head 5-2 and the fifth detection head 5-4 perform the second reading at the second timing t2. Then, the second detection head 5-1 and the sixth detection head 5-5 perform the third reading at the third timing t3.

Here, we will focus on the second reading performed at the second timing t2. In the second reading, a virtual angle calculation value calculated based on the detection value of the first detection head 5-0 in the first reading is used. Therefore, at the second timing t2, detection by the first detection head 5-0 is not actually performed. Therefore, current consumption can be suppressed.

The first detection head 5-0 belongs to a group in which 360° is divided into two and a group in which 360° is divided into three. Therefore, in the third embodiment, the first detection head 5-0 reads detection values at multiple timings within one cycle. Therefore, in this embodiment, the detection value read first in one cycle is used in subsequent readings.

P1(t1) illustrated in FIG. 5B is a calculated angle value based on the detected value of the first detection head 5-0 actually detected at the first timing t1. On the other hand, P2(t2) is a virtual angle calculation value calculated based on the angle calculation value P1(t1). Here, the sampling interval that is the interval between the first timing t1 and the second timing t2 is assumed to be ΔT. Further, let V be the rotational speed of the rotary scale. In this case, the virtual angle calculation value P2(t2) can be calculated by the following equation.

$$P2(t2)=P1(t1)+\Delta T \times V \qquad \text{Equation 1:}$$

In this way, current consumption can be suppressed by not detecting the first detection head 5-0 at the second timing t2.

Figure 7:
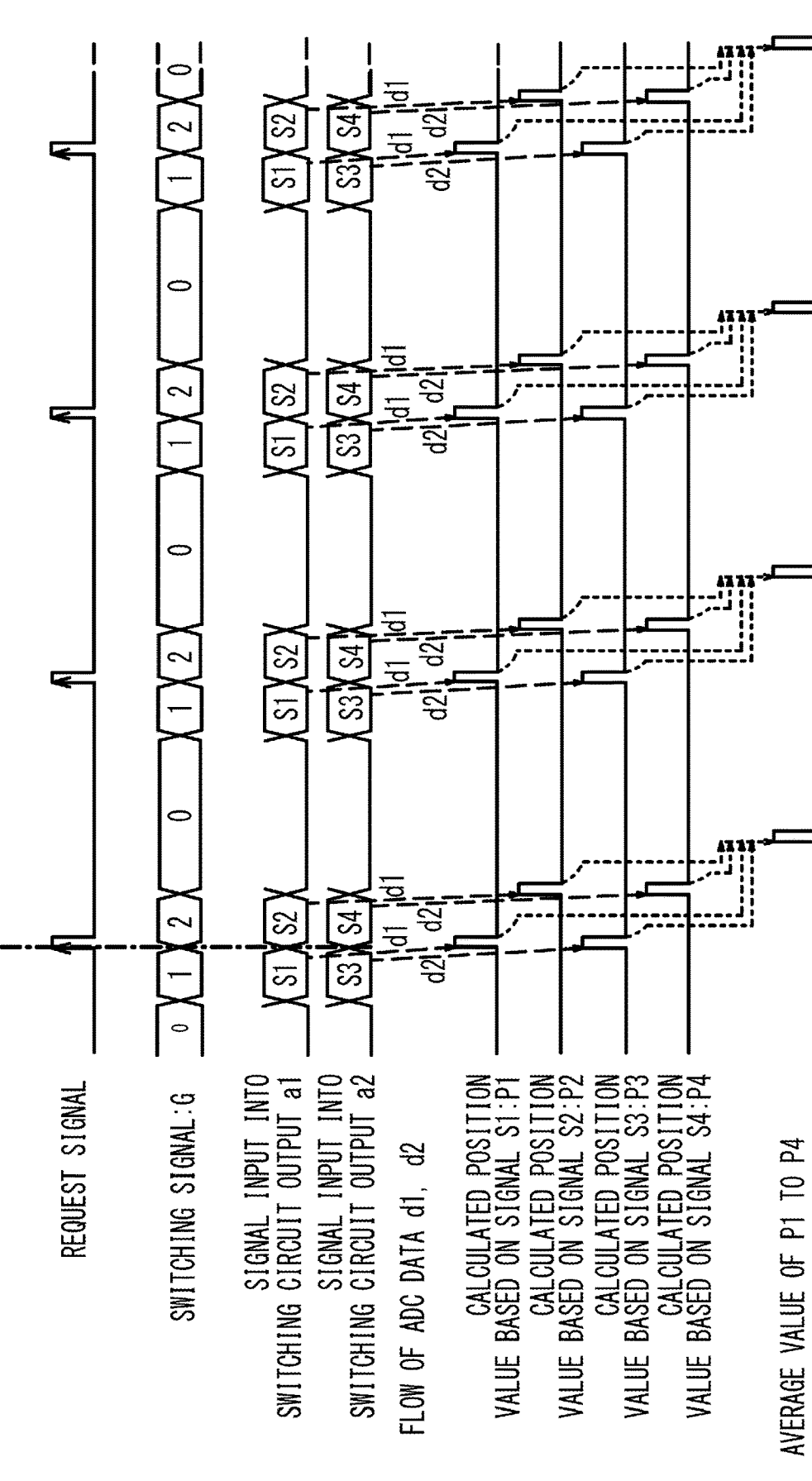
FIG. 7 is a time chart illustrating a flow of signals in a measuring device of Example.

(Example) Next, the measuring device 50 of Example will be described with reference to FIG. 6 to FIG. 8. Example is based on the first embodiment described with reference to FIG. 2A and FIG. 2B, and embodies each part to give a form close to the actual machine.

The measuring device 50 includes the rotary encoder 1 and the control device 10. The rotary encoder 1 includes the rotary scale 2 and the four detection heads 5-0 to 5-3. The four detection heads are installed at intervals of 90 degrees in a counterclockwise direction, with the position where the first detection head 5-0 is provided as a reference position (0 degrees). Each detection head is provided with the transmission coil 5a, the receiver coil 5b, and the transmission circuit 6, respectively.

The control device 10 includes the switching controller 11 and the calculator 15. The switching controller 11 includes the request signal transmitter 12, the timing generation circuit 13, and the switching circuit 14. The switching circuit 14 receives the signal S1 received by the receiver coil 5b of the first detection head 5-0, and receives the signal S2 received by the receiver coil 5b of the second detection head 5-1. Furthermore, the signal S3 received by the receiver coil 5b of the third detection head 5-2 is input to the switching circuit 14, and the signal S4 received by the receiver coil 5b of the fourth detection head 5-3 is inputted.

Figure 8:
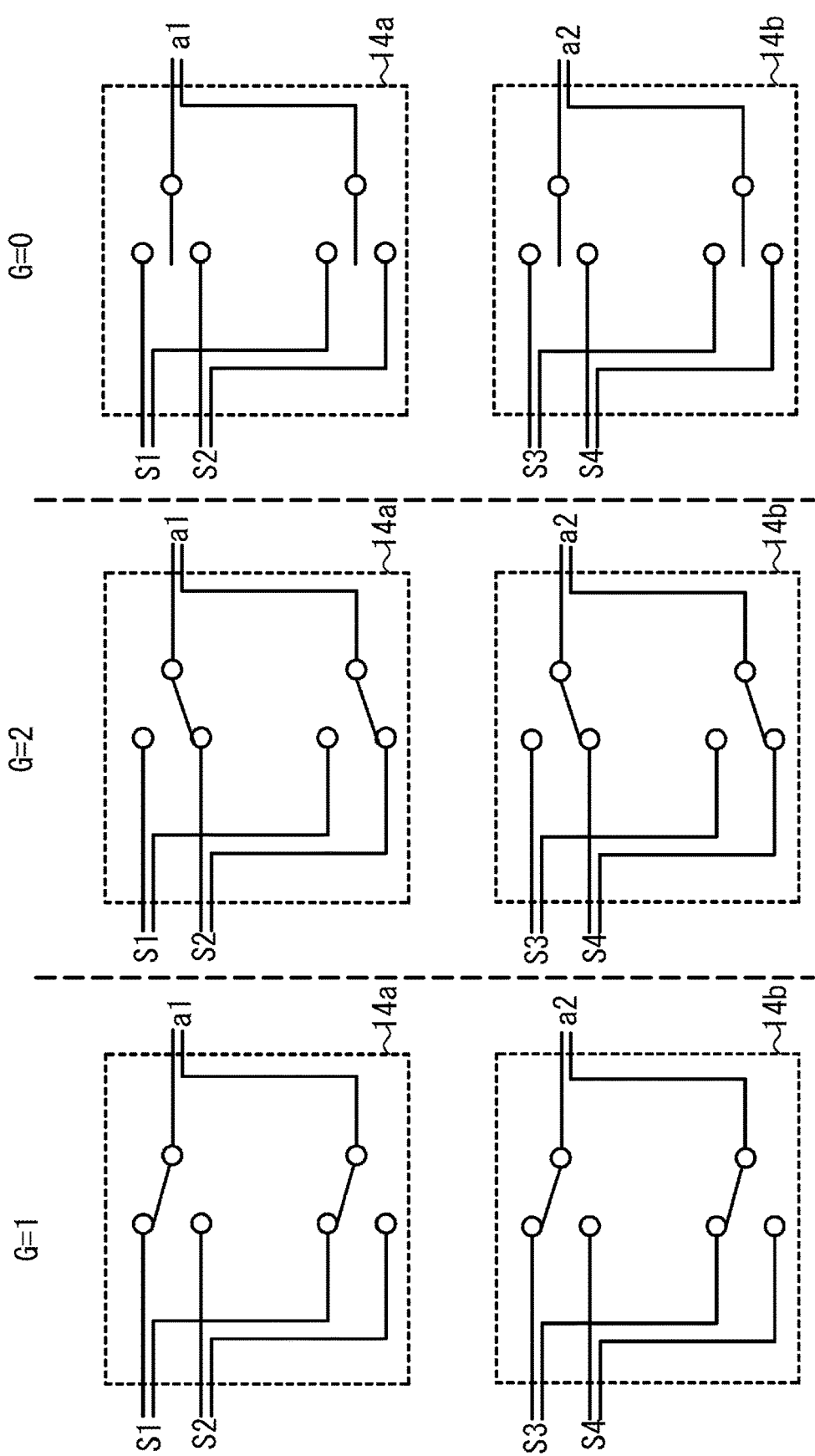
FIG. 8 is an explanatory diagram illustrating a state of a switching circuit that switches according to a switching signal in a measuring device of Example.

Referring to FIG. 8, a first switch section 14a and a second switch section 14b included in the switching circuit 14 are illustrated. The first switch section 14a selects either the signal S1 or the signal S2, and outputs the selected signal as the switching circuit output a1. The second switch section 14b selects either the signal S3 or the signal S4, and outputs the selected signal as the switching circuit output a2. The switching circuit 14 switches between the signal S1 and the signal S2 and between the signal S3 and the signal S4 using the switching signal G generated by the timing generation circuit 13. The relationship between the switching signal G and the state of the first switch section 14a and the relationship between the switching signal G and the state of the second switch section 14b will be described later.

The switching circuit 14 and the calculator 15 are connected by a connection line in which a first amplifier 16a and a first ADC (analog/digital conversion unit) 17a are provided, and a connection line in which a second amplifier 16b and a second ADC 17b are provided. The first amplifier 16a amplifies the switching circuit output a1, and the first ADC 17a performs analog/dental conversion on this and outputs ADC data d1. The second amplifier 16b amplifies the switching circuit output a2, and the second ADC 17b performs analog/dental conversion on this and outputs ADC data d2.

The calculator 15 includes a first angle calculator 18a, a second angle calculator 18b, and an average value calculator 19.

The ADC data d1 output from the first ADC 17a is input to the first angle calculator 18a. The first angle calculator 18a calculates a calculated angle value P1 and a calculated angle value P2 based on the ADC data d1. Note that when the first switch section 14a is in a state where the signal S1 is selected, the angle calculation value P1 is calculated. When the first switch section 14a is in a state where the signal S2 is selected, the angle calculation value P2 is calculated.

The ADC data d2 output from the second ADC 17b is input to the second angle calculator 18b. The second angle calculator 18b calculates the calculated angle value P3 and the calculated angle value P4 based on the ADC data d2. Note that when the second switch section 14b is in the state of selecting the signal S3, the angle calculation value P3 is calculated. When the second switch section 14b is in the state of selecting the signal S4, the angle calculation value P4 is calculated.

The average value calculator 19 calculates the average value of the angle calculation values P1 to P4. That is, the value obtained by adding up the calculated angle values P1 to P4 is divided by 4. The angle average value calculated by the average value calculator 19 is taken as a measurement result for one request signal.

Next, an example of a measuring method using the measuring device 50 having the above configuration will be described. FIG. 7 is a time chart illustrating the flow of signals in the measuring device 50 of Example.

First, the switching signal G will be explained. Referring to FIG. 8, the switching signal G of this embodiment includes three types of signals: G=0, G=1, and G=2. The switching signal G=1 is a signal that causes the first switch section 14a to select the signal S1 as the switching circuit output a1, and causes the second switch section 14b to select the signal S3 as the switching circuit output a2. The switching signal G=2 is a signal the causes the first switch section 14a to select the signal S2 as the switching circuit output a1, and causes the second switch section 14b to select the signal S4 as the switching circuit output a2. The switching signal G=0 causes the first switch section 14a to be in a state where the switching circuit output a1 is not transmitted, that is, neither the signal 1 nor the signal S2 is selected, and causes the second switch section 14b to be in the state where the switching circuit output a2 is not transmitted, that is, neither the signal S3 nor the signal S4 is selected. Since this is a period in which analog signal processing is not performed, the power of the first amplifier 16a, the first ADC 17a, the second amplifier 16b, and the second ADC 17b can be turned off, making it possible to reduce current consumption. The switching signal G is repeatedly transmitted as G=0, G=1, and G=2 at a constant cycle.

Note that the cycles of the switching signal G and the request signal are set to match. In this embodiment, the switching signal G is set to switch from G=1 to G=2 at the timing when the request signal rises. As a result, the angle average value calculated by the average value calculator 19 becomes the angle data at the timing when the request signal equivalently rises, that is, at the time when measurement is required by the measuring device.

The measuring device 50 calculates angle data at the timing when the request signal rises. In this embodiment, the switching signal G becomes G=1 immediately before the request signal rises. Therefore, at that point, the switching circuit 14 outputs the signal S1 as the switching circuit output a1, and outputs the signal S3 as the switching circuit output a2.

The switching circuit output a1 is converted into ADC data d1 via the first amplifier 16a and the first ADC 17a, and is input to the first angle calculator 18a. The first angle calculator 18a calculates the angle calculation value P1 based on the ADC data d1. The switching circuit output a2 is converted into ADC data d2 via the second amplifier 16b and the second ADC 17b, and is input to the second angle calculator 18b. The second angle calculator 18b calculates the angle calculation value P3 based on the ADC data d2.

The switching signal G switches to G=2 at the timing when the request signal rises. Therefore, the switching circuit 14 outputs the signal S2 as the switching circuit output a1, and outputs the signal S4 as the switching circuit output a2.

The switching circuit output a1 is converted into ADC data d1 via the first amplifier 16a and the first ADC 17a, and is input to the first angle calculator 18*a*. The first angle calculator 18*a* calculates the calculated angle value P2 based on the ADC data d1. The switching circuit output a2 is converted into ADC data d2 via the second amplifier 16*b* and the second ADC 17*b*, and is input to the second angle calculator 18*b*. The second angle calculator 18*b* calculates the angle calculation value P4 based on the ADC data d2.

The angle calculation values P1, P2, P3, and P4 are each input to the average value calculator 19. The average value calculator 19 calculates the angular average value of these values. The calculated angle average value is taken as the measured value at this timing.

Such detection and calculation are performed every time the timing signal rises periodically.

In this embodiment, the first reading of the pattern 3*a* is performed by some of the detection portions included in the plurality of detection portions at the first timing. Further, another reading of the pattern 3*a* is executed by another detection portion among the detection portions included in the plurality of detection portions at another timing different from the first timing. Thereby, current consumption can be suppressed.

The present invention is not limited to the specifically disclosed embodiments or examples and variations but may include other embodiments or examples and variations without departing from the scope of the present invention.

What is claimed is:

1. A measuring device comprising:
   a rotary encoder having a rotary scale and a plurality of detection portions, the rotary scale being arranged around a rotation axis and having a scale pattern in which a plurality of patterns are arranged along a circumferential direction, the plurality of detection portions being arranged around the rotation axis and each facing the rotary scale and reading the plurality of patterns from the scale pattern; and
   a control device configured to control the rotary encoder,
   wherein the control device causes one or some detection portions among the plurality of detection portions to perform a first reading of the plurality of patterns at a first timing, causes another or other detection portions different from the one or some detection portions to perform a second reading of the plurality of patterns at a second timing different from the first timing, and calculates a measurement result based on a first reading result of the first reading and a second reading result of the second reading.

2. The measuring device as claimed in claim 1, wherein the one or some detection portions include a plurality of detection portions arranged at positions dividing one rotation of the rotary scale into "n", and
   wherein "n" is an integer equal to or more than 2.

3. The measuring device as claimed in claim 1, wherein the another or other detection portions include a plurality of detection portions arranged at positions dividing one rotation of the rotary scale into "n", and
   wherein "n" is an integer equal to or more than 2.

4. The measuring device as claimed in claim 1,
   wherein the control device has a switching circuit for switching a first state in which the one or some detection portions for performing the first reading can be read and a second state in which the another or other detection portions for performing the second reading can be read.

5. A measuring method using a measuring device having: a rotary encoder having a rotary scale and a plurality of detection portions, the rotary scale being arranged around a rotation axis and having a scale pattern in which a plurality of patterns are arranged along a circumferential direction, the plurality of detection portions being arranged around the rotation axis and each facing the rotary scale and reading the plurality of patterns from the scale pattern; and a control device configured to control the rotary encoder,
   the method comprising:
   performing a first reading of the plurality of patterns using one or some detection portions among the plurality of detection portions at a first timing;
   performing a second reading of the plurality of patterns using another or other detection portions different from the one or some detection portions at a second timing different from the first timing; and
   calculating a measurement result based on a first reading result of the first reading and a second reading result of the second reading.

* * * * *